Patented Mar. 5, 1935

1,993,233

UNITED STATES PATENT OFFICE 1,993,233

METHOD FOR THE PRODUCTION OF RUBBER GOODS DIRECTLY FROM LATEX

George W. Winchester, West Haven, Conn., assignor to Heveatex Corporation, Melrose, Mass., a corporation of Massachusetts No Drawing. Application August 24, 1933, Serial No. 686,570

7 Claims. (Cl. 18—58)

My invention relates to an improved method for the production of rubber goods directly from latex, the object being to reduce the manufacturing costs and difficulties and improve the quality of such rubber goods over those produced by the methods now generally employed, namely, the so-called "coagulant" method, involving the use of chemicals, and the so-called "porous-form" method, which depends upon capillary action or a slight pressure differential.

My improved method (which is applicable to the production of a wide range of rubber goods, such as the goods known to the trade as dipped goods, sheet goods, thread goods, latex-coated fabrics and papers, and all kindred goods) consists essentially in exposing a portion of a given volume of latex to the direct action of a small body of a dehydrant without mixing or intermingling the two substances whereby the dehydrant will remove a portion of the water from the latex in the immediate vicinity of the dehydrant.

My invention further consists in the application of a dehydrant, either in the form of powder or a film, directly to the surface of a preferably non-porous form, and then dipping the same in a volume of latex and withdrawing it therefrom and then re-dipping it in the latex when the film of latex so applied is partially dehydrated by the dehydrant.

My invention further consists in certain details of procedure as will be hereinafter described and pointed out in the claims.

In the production of rubber goods directly from latex, my improved method employs the principle of the partial dehydration of a film on a form but effects that object in a different manner from that heretofore practised, and consists essentially in applying a suitable dehydrant directly to the surface of a non-porous form and then dipping the form in the latex bath and removing it therefrom and allowing a sufficient interval to elapse for the dehydrant upon the surface of the form to act upon the latex film applied over it until the viscosity of the film has sufficiently increased to prevent its flowage, after which the form so treated is again immersed in the bath and withdrawn therefrom to be again partially dehydrated by the continued action of the original deposit of dehydrant upon the non-porous form, the dehydrant in this case acting through the previously-applied film of latex, and so on until a sufficiently thick film of latex has been so built up.

For the illustration of my invention, I will describe its application to the production of goods produced by dipping a form, though, as before indicated, my invention is not limited to the production of goods by dipping a suitable form in a bath of latex.

In carrying out my invention, in producing "dipped goods", so-called, I may use forms made of any one of a great variety of materials, such as glass, porcelain, iron, aluminum, wood, plaster of Paris, and so on. By preference, on account of its cheapness and lightness, I shall use forms made of aluminium. It is not imperative that the form shall be non-porous or impermeable, though an impermeable form is preferred, since the superficial applicant of a powdered or liquid dehydrant directly to the surface of the form meets the practical requirements of my improved method.

As to the dehydrant used in practicing my improved method, I do not limit myself to any one dehydrant, with the single limitation that the dehydrant employed must be of such a character that in carrying on my method it will absorb a considerable volume of water without itself becoming fluid. Among dehydrants which will serve the purpose of my improved method, I may mention that karaya gum, gum arabic, gum acacia, starch, casein, and ammonium alginate may be employed, as well as dehydrants known under such trade or commercial names as carob bean gum, "Aqua Resin", "Hydro Resin", methyl cellulose, and so on. All of the foregoing dehydrants are of an organic colloidal nature and are capable of being swollen only in considerable water to form viscous or gelatinous colloidal aqueous solutions which lend themselves to deposition as a smooth layer of substantially uniform thickness on the molds. It is thus seen that such dehydrants as have the property of absorbing a large quantity of water, before the combination becomes liquid, are particularly suitable. In general, the materials enumerated give up the water on the application of heat, and then return to their original condition. Substantially all of the materials named, if added to liquid latex, act as stabilizers, rather than as coagulants.

In practicing my invention, I initially apply a dehydrant of the character suggested to the surface of a suitable and preferably non-porous form, either as a powder, or by making a solution and dipping the form in it, after which the form is dried—preferably in the air. Only a very small amount of the dehydrating material is required. For instance, if karaya gum is used, one pound is sufficient to cover 10,000 square feet of form surface with a quantity sufficient to deposit a film of rubber of at least .050 of an inch over this entire area.

While the dehydrating element employed in practicing my method may be dusted upon the form, as suggested above, a simpler method is to make a dilute solution of one or more of these dehydrating materials and dip the form in the solution. On its removal from the solution, it is dried, after which it will be found to have an even distribution over its entire surface of the dehydrating material. Having coated the form with the dehydrating material as described, it is immersed in the latex bath, where it is allowed to remain for a short period, depending upon the type of the latex bath and the thickness of the film of latex it is desired to initially deposit. The form is then slowly withdrawn from the latex bath. The action of the dehydrant superficially applied to the form upon the film of latex now covering the dehydrant will be so rapid that the viscosity of the latex will be so increased that it will not run or sag, as would be the case when dipping a non-porous form under the same conditions without the layer or stratum of dehydrating material. After its removal from the latex bath, the form is held in the air for a sufficient time to allow a further action of the dehydrant upon the latex, after which the form is again introduced for a short period into the latex bath and slowly withdrawn as before, the initial underlying deposit of dehydrant upon the surface of the form acting through the superimposed layer of latex until the desired thickness of the latex deposit has been secured, the dehydrant acting through the intermediate layers of latex to partially dehydrate the outer layer.

The intervals between the dippings of the form in the latex bath and the length of time in which the form is immersed in the bath will vary according to the character of the dehydrant, the type and viscosity of the latex bath and the desired thickness of the film. All of these factors will, obviously, depend upon the circumstances attending each application of my improved method.

To take an illustrative case, it may be supposed that the latex bath has a concentration of 60% solids by weight. A form having been previously dipped in a dilute solution of karaya gum and the solution allowed to dry upon the form, the same is then dipped in the latex bath for a period of about two minutes or more. The form is then slowly withdrawn from the bath, preferably devoting a minute to this operation. The form is now held in the air for several minutes to allow a further action of the dehydrant upon the latex film, after which the form is again introduced into the latex bath for a period of about two minutes or more and withdrawn slowly as before, and so on.

It is to be observed that re-dipping of the mold is performed before the pre-dipped layer of latex has undergone complete drying. Indeed, it is highly desirable that one latex coating be superposed on a previous latex coating before such previous latex coating has been completely dried, as an undried latex coating is more easily permeable to the water which must be abstracted from subsequent latex coatings. The fact is that the time interval allotted for exposure of the latex-coated form to the atmosphere after each dipping operation is not primarily for the purpose of drying the previous coating or coatings to completion, but essentially for the purpose of permitting the dehydrant layer next to the mold to abstract as much water as practical from the latex coating or coatings before a succeeding dip in the latex is effected to produce a succeeding coating, such succeeding dip in the latex hence being accompanied by a deposition of far more latex on the form than would be the case if the previous latex coating or coatings were dried substantially to completion. The dehydrants which I employ are preferably those which, although they are capable of absorbing a large amount of water and can eventually be put into the form of a viscous or gelatinous colloidal solution, nevertheless, are capable of absorbing in dry condition so much water without becoming freely flowable or leachable from the form, as to admit of successive depositions of latex thereon by a re-dipping practice, such as I have described, and thereby have built thereon a combined rubber deposit of substantial thickness.

I do not limit myself to forms made of any one material, nor to the employment of any one dehydrant, so long as the dehydrant chosen is of such a character that it will absorb a large amount of water before the combination becomes liquid. The essential feature of my invention, as it pertains to the making of dipped goods, is the initial superficial application of a dehydrant, either in the form of a powder or a solution, to a suitable form and then immersing the form so coated into a latex bath and repeating the process until the desired thickness of latex has been built up upon the form.

My improved method, whatever its application to the production of rubber goods, has many commercial advantages over methods now in general use. One of these advantages is that the process requires only a small initial expense. By the installation of very simple and inexpensive equipment it is readily applicable to the production of articles of manufacture making use of much of the equipment formerly used before the introduction of the latex method. For instance, in the production of gloves from a rubber-gasoline cement, it has been standard practice to use porcelain forms which were dipped repeatedly in the cement, while in the production of rubber footwear wooden lasts are used on which sheets of rubber are laid by hand. Either of these forms is entirely suitable for the production of their respective types of articles by my new process, as it is adaptable to a wide variety of forms. This greatly reduces the cost of the introduction of the process. Moreover, I avoid many of the difficulties encountered by the use of the "porous-form" method, employing forms of more or less porosity, which rely upon the capillary action to extract a percentage of the water from the latex film upon the porous form. This method is objectionable for the reason that porous forms soon become clogged and have to be renewed or cleaned which is both expensive and inefficient, since a form once used, cannot be perfectly cleaned. Since any porous form becomes progressively clogged in use, the product varies in thickness for the reason that the less the amount of water extracted the thinner the sheet deposited.

There are many advantages as a result of not using any coagulant. Most of these materials are volatile or corrosive or both, making it necessary to install ventilating equipment and dipping equipment designed to withstand corrosion, all of which is avoided by applicant's method. Furthermore, when coagulants are used it is necessary to wash out any excess left in the goods as their presence adversely affects the ageing quality of manufactured articles. When using a so-called "coagulant" method, a portion of these materials gradually is introduced into the latex bath with the result that the basicity of the latex bath is changed with the resultant change in the viscosity of the latex and, therefore, in the thickness of the deposit.

Also the effect of the coagulant upon the latex is astringent, and so results in a contraction of the film, which tends to reduce the thickness of the latex film at different points upon the form, dependent in each case upon the shape thereof. This objection, which is very serious when producing goods on a flat form, is entirely overcome by my improved method, in which the direct dehydration of the film induces no rapid contraction thereof, but merely thickens it uniformly by the extraction of water.

In the production of sheet rubber from latex by my improved process, a drum partly submerged in a volume or bath of latex picks up a film thereof and converts it into a sheet by its exposure to the direct action of a suitable dehydrant, the speed of the drum being regulated to permit effective action of the dehydrant upon the latex film upon the drum. Rubber thread may be produced on the same principle. Also, fabrics of any suitable character may be treated with a solution of a dehydrant, then dried and then dipped into or spread or sprayed with latex, which is forthwith sufficiently dehydrated and set without being actually intermingled with the dehydrant taken up by the fabric.

Other obvious applications of my improved method may be resorted to in the production of rubber goods of whatever character, but in every application of my invention the essential principle of exposing latex directly to the action of a dehydrant without intermingling the two substances will be the controlling feature.

Throughout my description and in my claims, I use the word "latex" to mean a dispersion of rubber in water. It may be either a natural dispersion, properly preserved, or an artificial dispersion. It may be either unvulcanized or vulcanized. It may be unconcentrated or concentrated and may or may not contain vulcanizing ingredients and other compounding materials. Either thickened or unthickened latex may be used.

I claim:

1. A method for the production of rubber goods directly from latex, consisting in applying a colloidal dehydrant capable of absorbing a large amount of water directly to the surface of a form, then dipping the form in a volume of latex, then removing the form therefrom and exposing it to the atmosphere until the dehydrant has only partly dehydrated the latex film so adhered to the form, and then re-dipping the form until the required deposit of latex has been secured, the initial deposit of the dehydrant upon the form acting upon and through the successive, partly dehydrated films resulting from re-dipping the form in the latex.

2. A method for the production of rubber goods directly from latex, consisting in applying a powdered colloidal dehydrant capable of absorbing a large amount of water to the surface of a form, then dipping the powdered form in a volume of latex and removing it, then re-dipping it in the volume of latex after the dehydrant powder has only partially dehydrated the latex film adhered to the form of dipping it in the latex.

3. A method for the production of rubber goods directly from latex, which comprises applying to a form in water-swollen, gelatinous condition, a colloidal dehydrant capable of assuming such condition only in the presence of considerable water, drying the dehydrant so applied to the form, dipping the form in a bath of latex, removing the form from such bath and exposing it to the atmosphere until the dehydrant has only partly dehydrated the latex deposited on the form carrying the partly dehydrated latex coating, repeating the steps of dipping such form in the bath of latex and of removing it from the bath and exposing it to the atmosphere until the desired thickness of latex coating has been realized, and finally drying the combined latex coatings thereby produced.

4. A method for the production of rubber goods directly from latex, which comprises applying to a form in water-swollen, gelatinous condition, a dehydrant of an organic, colloidal nature capable of assuming such condition only in the presence of considerable water, drying the dehydrant so applied to the form, dipping the form in a bath of latex, removing the form from such bath and exposing it to the atmosphere until the dehydrant has only partly dehydrated the latex deposited on the form carrying the partly dehydrated latex coating, repeating the steps of dipping such form in the bath of latex and of removing it from the bath and exposing it to the atmosphere until the desired thickness of latex coating has been realized, and finally drying the combined latex coatings thereby produced.

5. A method for the production of rubber goods directly from latex, which comprises applying to a form a colloidal dehydrant of an organic nature capable of absorbing a large amount of water but having no substantial coagulative effect on latex, dipping the form in a bath of latex, removing the form from such bath and exposing it to the atmosphere until the dehydrant has only partly dehydrated the latex deposited on the form, repeating the steps of dipping such form carrying the partly dehydrated latex coating in the bath of latex and of removing it from the bath and exposing it to the atmosphere until the desired thickness of latex coating has been realized, and finally drying the combined latex coatings thereby produced.

6. A method for the production of rubber goods directly from latex, which comprises applying to a form an aqueous solution of a colloidal dehydrant of an organic nature capable of absorbing a large amount of water but having no substantial coagulative effect on latex, drying the form, dipping the form in a bath of latex, removing the form from such bath and exposing it to the atmosphere until the dehydrant has only partly dehydrated the latex deposited on the form, repeating the steps of dipping such form carrying the partly dehydrated latex coating in the bath of latex and of removing it from the bath and exposing it to the atmosphere until the desired thickness of latex coating has been realized, and finally drying the combined latex coatings thereby produced.

7. A method for the production of rubber goods directly from latex, which comprises applying to a form a powdered colloidal dehydrant of an organic nature capable of absorbing a large amount of water but having no substantial coagulative effect on latex, dipping the form in a bath of latex, removing the form from such bath and exposing it to the atmosphere until the dehydrant has only partly dehydrated the latex deposited on the form, repeating the steps of dipping such form carrying the partly dehydrated latex coating in the bath of latex and of removing it from the bath and exposing it to the atmosphere until the desired thickness of latex coating has been realized, and finally drying the combined latex coatings thereby produced.

GEORGE W. WINCHESTER.